United States Patent

Trimmer

[11] 4,033,035
[45] July 5, 1977

[54] BEAM CUTTING AND MITERING DEVICE

[76] Inventor: David G. Trimmer, 5541 Deodar, Montclair, Calif. 91763

[22] Filed: Aug. 3, 1976

[21] Appl. No.: 711,358

[52] U.S. Cl. .................................. 30/122; 30/500
[51] Int. Cl.² ...................................... B27B 17/14
[58] Field of Search ............ 30/122, 500, 371, 372, 30/373, 374

[56] References Cited

UNITED STATES PATENTS

| | | | |
|---|---|---|---|
| 2,839,097 | 6/1958 | Siria | 30/500 X |
| 2,860,671 | 11/1958 | Wilder | 30/122 |
| 2,879,814 | 3/1959 | Scott | 30/122 |
| 3,864,830 | 2/1975 | Haddon | 30/371 |
| 3,965,788 | 6/1976 | Granberg | 30/371 |

Primary Examiner—James L. Jones, Jr.
Assistant Examiner—J. C. Peters
Attorney, Agent, or Firm—W. Britton Moore

[57] ABSTRACT

A large dimension beam cutting, detailing and mitering attachment for removable connection to the base plate of a portable circular power saw, wherein the cutting blade has been removed therefrom, and which includes a flat base attachment plate having a flat cutter bar and endless saw chain arranged thereon, with the bar fixedly attached thereto and depending at right angles therefrom. A sprocket associated with the saw chain is mounted on the drive shaft of the saw and the base attachment plate flatly receives and has means for attaching the cicular saw base plate thereto so that beams may be smoothly cut or mitered when the attachment plate is flatly disposed thereon and moved thereover. This enables the saw chain to be used in the same manner as a circular saw.

5 Claims, 6 Drawing Figures

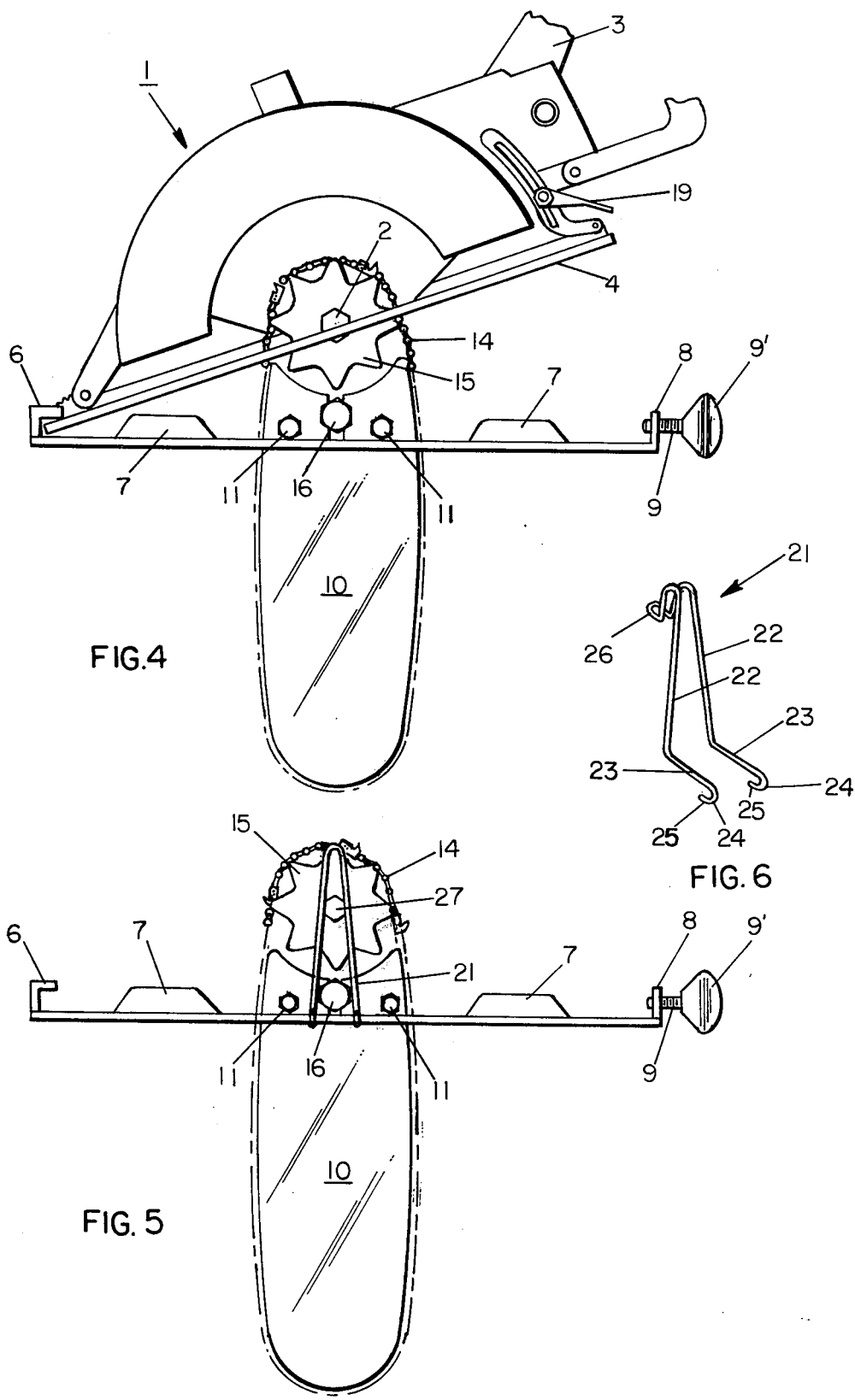

BEAM CUTTING AND MITERING DEVICE

This invention relates to a saw chain attachment for portable circular power saws which may be flatly disposed on and for cutting, detailing and mitering large dimension beams and the like in the manner of a circular saw.

Heretofore, it has been proposed to provide saw chain attachments for portable circular saws, as in prior U.S. Pat. Nos. to Siria 2,839,097, Wilder 2,860,671 and Scott 2,879,814, for converting circular saws into chain saws. However, when so converted, such saw devices may only be used as chain saws for cutting timber and the like, and are not adaptable for use in the manner of a circular saw for carpentry cutting, detailing and mitering of large dimension beams.

The principal object of the present invention is to provide a saw chain attachment plate including a flat cutter bar and endless saw chain depending therefrom for removable attachment to a portable circular saw when the blade is removed therefrom so that the chain saw is adaptable for use in generally the same manner as a circular saw.

Another object is the provision of a saw chain attachment plate having a cutter bar and endless saw chain and drive sprocket arranged thereon and for attachment to the drive shaft of a portable circular saw to enable the base plate of the latter to be connected to the attachment plate and the latter flatly disposed on a beam to enable the saw chain to effect smooth cutting, detailing or mitering thereof in the manner of a circular saw.

A further object is to provide a saw chain attachment plate including angle clips, guides and tightening means for receiving and connecting the base plate of a portable circular saw thereto.

Still another object is to provide a saw chain attachment plate with depending cutter bar, endless saw chain and drive sprocket for attachment to a portable circular saw and wherein wire clip means is provided for interconnecting the sprocket, cutter bar and saw chain for storage and before assembly on the circular saw.

A still further object is the provision of a saw chain attachment plate, cutter bar and drive sprocket wherein the sprocket is readily manually attachable to the portable circular saw, and the base plate of the latter is connectable to the attachment plate without the use of special tools.

Another object is the provision of a saw chain atachment plate and associated cutter bar and endless saw chain and drive sprocket for attachment to the drive shaft of a portable circular saw and wherein the base plate of the latter is so connected to the attachment plate that the saw chain may be handled and used in the manner of a portable circular saw to cut or miter beams used in exposed beamwork and the like.

There and other objects and advantages will be apparent by considering the following description with the accompanying drawings, wherein FIG. 1 is a perspective view of a portable circular power saw, with the circular saw blade removed, and with the attachment plate, cutter bar, endless saw chain and drive sprocket of the present invention arranged thereon;

FIG. 4 is a side elevation of the attachment plate and associated cutter bar, endless saw chain and drive sprocket, during assembly;

FIG. 5 is a side elevation of the attachment plate, cutter bar, saw chain, drive sprocket, and wire clip disassembled from a portable circular saw in position for storage; and FIG. 6 is a perspective view of the removable wire assembly and storage clip.

Figure 1:
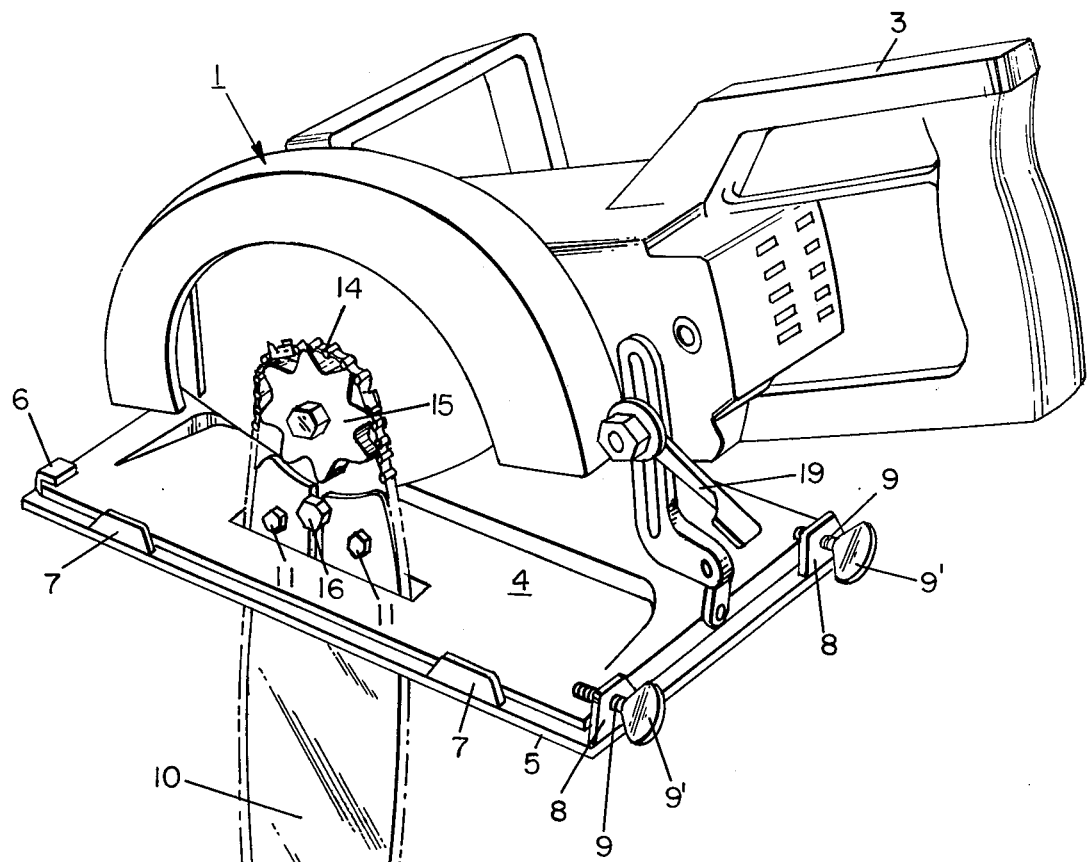
Figure 2:
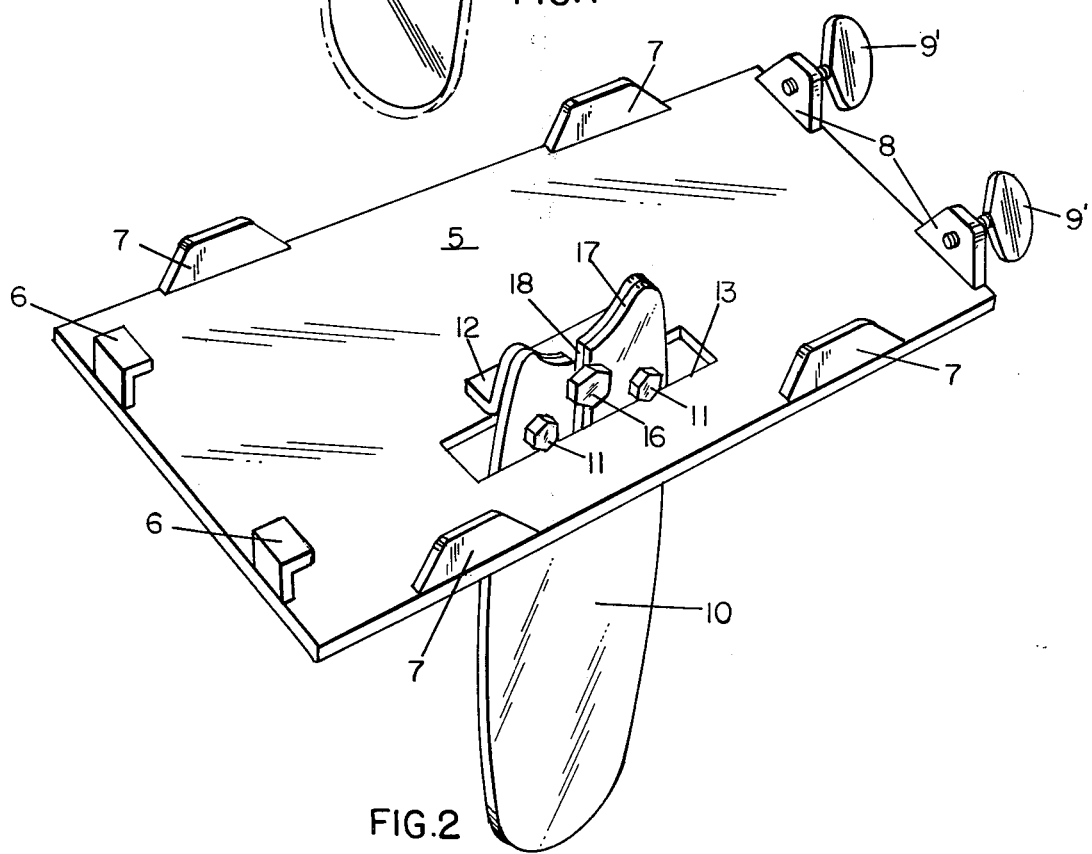
FIG. 2 is a perspective view of the attachment plate and depending cutter bar attached thereto, but with the saw chain and drive sprocket removed therefrom.
Figure 3:
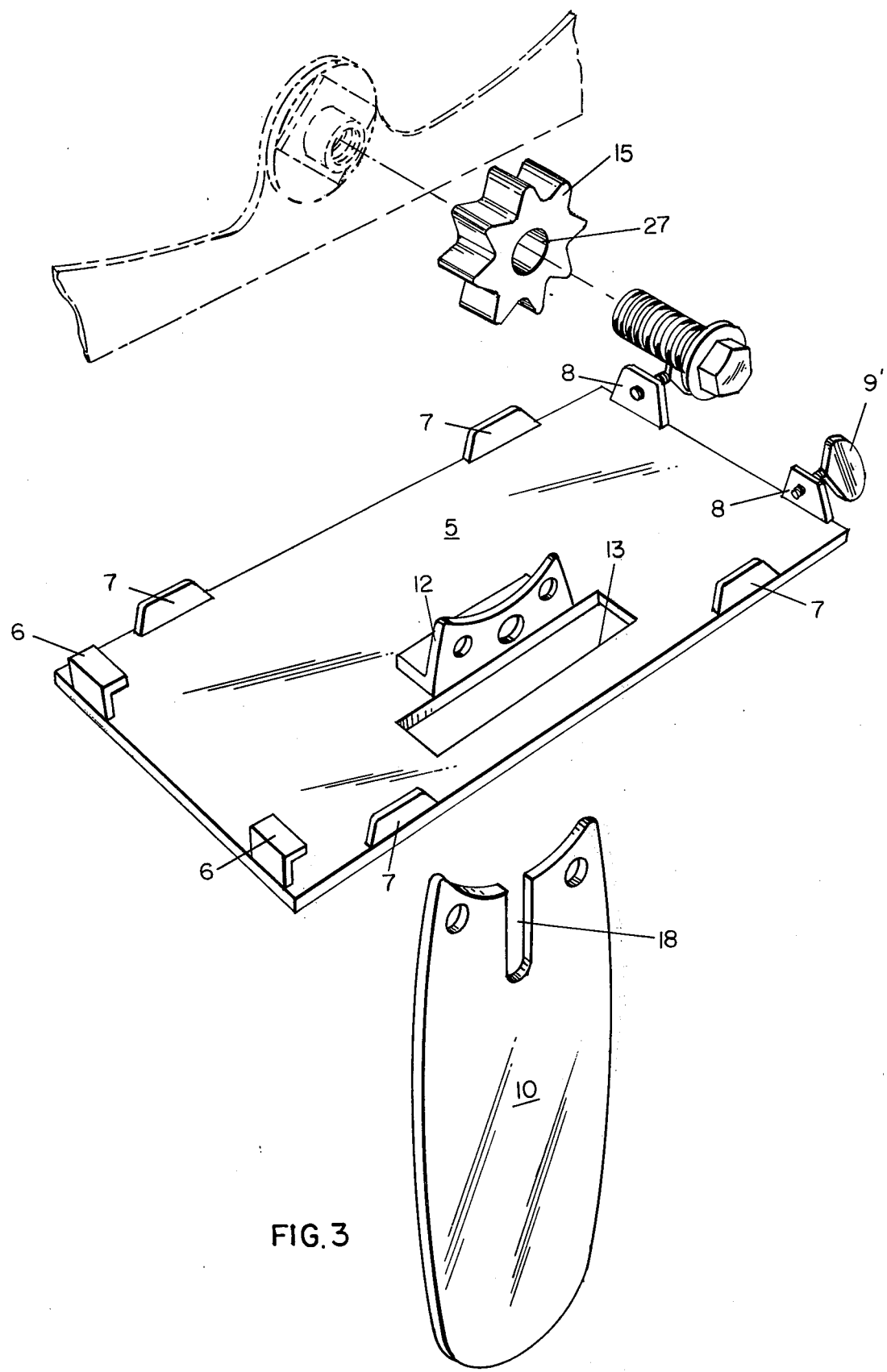
FIG. 3 is an exploded view of the attachment plate, cutter bar and attaching means therefor.

Referring more particularly to the drawings, wherein similar reference characters designate like parts throughout the several views, numeral 1 generally designates a conventional portable circular saw housing, powered by an electric motor, not shown, and including a drive shaft 2, handle 3, and flat support shoe 4, and wherein the usual circular saw blade has been removed.

A generally flat rectangular attachment plate 5 dimensioned slightly larger than support shoe 4 preferably formed of some suitably light material, such as aluminum, is adapted to receive and have the latter connected thereto, with two upwardly extending inwardly bent angle clips 6 suitably provided at one end of plate 5 and two spaced upstanding guide flanges 7 at the side edges thereof. Thus, when the circular saw 1 is tilted, the forward edge of support shoe 4 may be extended beneath and against clips 6 and, upon lowering of saw 1, the support shoe 4 will be guided by flanges 7 until it is flatly disposed on plate 5. Upstanding spaced flanges 8 at the rear edge of plate 5 receive threaded adjustment screws 9 having finger portions 9' therethrough which will extend over the engage the upper rear portion of the support shoe to retain the latter in assembled position thereon, as best shown in FIG. 1.

An elongated flat cutter bar 10 is bolted, as at 11, to an angle bracket 12, suitably affixed to the upper face of attachment plate 5 adjacent to a slot 13 formed therein, so that the cutter bar extends therethrough and depends at right angles from the plate. A conventional endless saw chain 14, including a plurality of connected links and teeth, is arranged on and travels around the grooved outer edge of the cutter bar, in the usual manner, and over a drive sprocket 15 arranged above the plate and mounted on the outer end of drive shaft 2, after the cutter blade has been removed therefrom. A bolt 16, also projecting from bracket 12 between bolts 11, extends through a vertically extending slot 18 in the curved upper end 17 of cutter bar 10 so that, when bolts 11 are removed, the cutter bar may be moved radially outwardly or inwardly to effect adjustment of saw chain 14, after which bolts 11 are replaced and tightened. It will be apparent that rotation of sprocket 15 by drive shaft 2 will move the saw chain over the cutter bar to effect sawing action.

With attachment plate 5 positioned on a flat surface and the cutter bar 10 and saw chain 14 depending therefrom, the circular saw 1 may be tilted upwardly relative to its forward edge and the latter is inserted beneath clips 6 and the saw is lowered onto plate 5, being guided by flanges 7 thereon. Adjustment screws 9 are then manually tightened by the finger portions 9' to attach the parts together, in an obvious manner. The sprocket 15 is next positioned on drive shaft 2 and suitably tightened thereon. As the circular saw 1 is provided with the usual adjustment lever 19, which may be loosened to enable the saw and drive shaft to be lowered and the saw chain 14 arranged on cutter bar 10 and over sprocket 15. While holding the attachment plate 5 down, the saw is pulled upwardly to apply the desired tension on the saw chain 14 and adjustment lever 19 is tightened.

In view of the compactness and light weight of the attachment plate 5 and associated cutter bar and saw chain, the combined saw of FIG. 1 may be readily handled and positioned to top of a beam being cut or mitered and guided by the user thereacross to insure of an accurate, smooth and square cut being made therein. For example, and because of the length of the cutter bar and saw chain, the saw many easily be employed to make an eight inch cut in a beam which would require a circular saw blade twenty inches in diameter, except that no portable power saw would be large enough to accommodate a blade of that diameter. Furthermore, the weight thereof would be prohibitive if this were possible. Thus, it will be evident that the combined saw may be handled and used in generally the same manner as a circular saw, but with decidedly increased effectiveness.

It is desirable that, before assembly of the attachment plate, cutter bar, saw chain, and drive sprocket on the circular power saw, and to enable separate storage thereof, a clip 21, best shown in FIGS. 5 and 6, be employed to retain these parts in operative position. Thus, the clip 21 may be formed of a single wire bent into shape with two spaced downwardly extending legs 22, flared outwardly, as at 23, at their lower ends and then bent forwardly, as at 24, and, thence, inwardly to provide hooks 25 adapted to clamp the side edge of attachment plate 5. The upper ends of the legs 22 are bent rearwardly and downwardly, as at 26, to provide an upper end adapted to be inserted through a central bore 27 in sprocket 15 so that the latter will rest thereon and be supported thereby. When the clip is so positioned, the saw chain 14 will be retained in position relative to the cutter bar 10 and sprocket 15 and enable the entire attachment to be so stored.

While a preferred embodiment of this cutting and mitering attachment has been shown and described, it is to be understood that various changes and improvements may be made therin without departing from the scope and spirit of the appended claims.

I claim:

1. A cutting and mitering attachment for a portable power driven circular saw including a housing, a drive shaft wherein the saw blade has been removed therefrom and support shoe, a flat generally rectangular attachment plate, angle clip means at one end of said plate and guide flange means at the side edges thereof whereby said support shoe is flatly mounted thereon, and screw means at the other end of said plate for retaining said shoe and housing in position, a slot in said plate having a cutter bar extending therethrough so as to depend therefrom at right angles thereto, a sprocket arranged above the upper end of said cutter bar and mounted on said drive shaft, and an endless saw chain disposed on said cutter bar and extending over said sprocket so as to be driven thereby, whereby said plate may be flatly arranged on a beam and manually moved thereover so that the cutter bar and saw chain depending vertically therebelow will cut the beam as a circular saw.

2. A cutting and mitering attachment as in claim 1, including angle bracket means on said plate adjacent said slot, and said cutter bar being attached to said bracket means.

3. A cutting and mitering attachment as in claim 2, wherein said sprocket is arranged above said angle bracket means, and clip means engageable with said sprocket and said attachment plate for retaining said sprocket, saw chain and plate together for storage and before assembly.

4. A cutting and mitering attachment as in claim 3, including elongated wire clip means having means at the upper end engageable with a central bore in said sprocket and having hook means at its lower end for clamping engagement with said attachment plate.

5. A cutting and mitering attachment as in claim 4, wherein said wire clip means includes elongated spaced legs being bent outwardly and downwardly providing hook means at their lower ends for clamping engagement with said attachment plate, and the upper end of said legs being bent rearwardly and downwardly for engaging and supporting said sprocket.

* * * * *